United States Patent [19]

Hennessey

[11] Patent Number: 4,744,055

[45] Date of Patent: * May 10, 1988

[54] ERASURE MEANS AND DATA STORAGE SYSTEM INCORPORATING IMPROVED ERASURE MEANS

[75] Inventor: Michael Hennessey, Detroit, Mich.

[73] Assignee: Energy Conversion Devices, Inc., Troy, Mich.

[*] Notice: The portion of the term of this patent subsequent to May 19, 2004 has been disclaimed.

[21] Appl. No.: 770,137

[22] Filed: Aug. 28, 1985

Related U.S. Application Data

[63] Continuation-in-part of Ser. No. 752,742, Jul. 8, 1985, Pat. No. 4,667,309.

[51] Int. Cl.$^4$ ............................................. G11C 13/00
[52] U.S. Cl. .................................... 365/113; 365/163; 369/275
[58] Field of Search ..................... 365/113, 163, 218; 357/2, 16; 369/275, 279; 346/137, 135.1

[56] References Cited

U.S. PATENT DOCUMENTS 3,696,344 10/1972 Feinleib et al. ...................... 365/113
3,778,785 12/1973 von Gutfeld ........................ 365/113
4,660,175 4/1987 Strand ................................ 365/113
4,667,309 5/1987 Hennessey .......................... 365/113

Primary Examiner—Joseph A. Popek
Attorney, Agent, or Firm—Richard M. Goldman; Marvin S. Siskind

[57] ABSTRACT

Disclosed herein is a method of and system for writing data into, reading data out of, and/or removing data from a state changeable chalcogen medium. According to the disclosed invention projected beam energy is applied to the medium to change a discrete portion of the medium from a solid state of first relative order to a solid state of second relative order through an intermediate state of relatively high mobility. The invention disclosed herein further contemplates applying projected beam energy to the medium to change the discrete portion of the medium from the state of second relative order through a relatively high mobility intermediate state back to the state of first relative order. In this way the written carrier to noise ratio is relatively high, the erased carrier to noise ratio is relatively low, and the carrier to noise ratios and contrast ratio are maintained relatively constant substantially independent of the cycle numbers.

19 Claims, 2 Drawing Sheets

ERASURE MEANS AND DATA STORAGE SYSTEM INCORPORATING IMPROVED ERASURE MEANS

CROSS REFERENCE TO RELATED APPLICATION

This is a continuation-in-part of our commonly assigned, copending U.S. Application Ser. No. 752,742 filed July 8, 1985 for IMPROVED ERASURE MEANS, now U.S. Pat. No. 4,667,309.

FIELD OF THE INVENTION

The invention disclosed herein relates to projected beam data storage devices where data is stored in a material, e.g. a state changeable material, by the application of projected beam energy to the material.

BACKGROUND OF THE INVENTION

Non-ablative, state changeable, projected energy beam data storage system, for example optical data storage systems, record information in a state changeable material that is switchable between at least two detectable states by the application of projected beam energy thereto. The projected beam energy may be optical energy, particle beam energy, or the like.

The state changeable optical data storage material is present in an optical data storage device having a structure such that the optical data storage material is supported by a substrate or substrates and encapsulated in encapsulants. The various layers of encapsulants may include sealing layers, anti-ablation materials and layers, thermal insulating materials and layers, anti-reflection layers, and reflective layers. Various layers may perform more than one of these functions. The thicknesses of these layers, including the layer of state changeable data storage material, are optimized whereby to minimize the energy necessary for state change while retaining the high contrast ratio, high carrier to noise ratio, and high stability of the state changeable data storage material.

The state changeable material is a material capable of being switched from one detectable state to another detectable state by the application of projected beam energy thereto. State changeable materials are such that the detectable states may differ in their morphology, surface topography, relative degree of order, relative degree of disorder, nature of order or disorder, electrical properties, and/or optical properties. Moreover, the changes in properties must be detectable by, for example, the electrical conductivity, electrical resistivity, optical tranmissivity, optical absorption, optical reflectivity, index of refracting, or a combination thereof.

The data storage material is typically deposited as a disordered material and formed or initialized to a solid system having (1) relatively reproducible properties in the relatively ordered or even crystalline state, and (2) relatively reproducible properties in the relatively disordered or even amorphous state. Moreover, there should be a relatively high degree of history invariant discrimination between these states for a high number of write-erase cycles, i.e. for a relatively high number of vitrify-crystallize cycles.

Tellurium based materials have been utilized as phase changeable memory materials. This effect is described, for example, in J. Feinleib, J. deNeufville, S. C. Moss and S. R. Ovshinsky, "Rapid Reversible Light-Induced Crystallination of Amorphous Semiconductors", *Appl. Phys. Lett.*, Vol. 18(6), pages 254–257 (Mar. 15, 1971), and in U.S. Pat. No. 3,530,441 to S. R. Ovshinsky for *Method and Apparatus For Storing And Retrieving Of Information*. A recent description of tellurium-germanium-tin systems, without oxygen, is in M. Chen, K. A. Rubin, V. Marrello, U. G. Gerber, and V. B. Jipson, "Reversibility And Stability of Tellurium Alloys For Optical Data Storage," *Appl. Phys. Lett.*, Vol. 46(8), pages 734–736 (Apr. 15, 1985). A recent description of tellurium-germanium-tin systems with oxygen is in M. Takanaga, N. Yamada, S. Ohara, K. Nishiuchi, M. Nagashima, T. Kashibara, S. Nakamura, and T. Yamashita, "New Optical Erasable Medium Using Tellurium Suboxide Thin Film", Proceedings, SPIE Conference on Optical Data Storage, Arlington, Va., 1983, pages 173–177.

Tellurium based state changeable materials have heretofore been characterized as single phase or multi-phase systems (1) where the ordering phenomena include nucleation and growth processes (both homogeneous and hetrogeneous) to convert a system of disordered materials to a system of ordered and disordered materials, and (2) where the vitrification phenomenon includes melting and rapid solidification of the phase changeable material to form a system of disordered and ordered components from a system largely of disordered components. The above phase changes and separations occur over relatively small distances with intimate interlocking phases and gross structural discrimination.

In chalcogen type memory materials the measures of performance include (1) the contrast ratio, that is, the difference in reflectivities of the states divided by the sums of the reflectivities of the states, and (2) the carrier to noise ratios of both (a) the "written" and (b) the "erased" states. The failure mode of the memory material is evidenced by the deterioration in the measures of performance with respect to the number of cycles. That is, failure may be evidenced by (1) a reduction in contrast ratio with increasing cycles, or by (2) a reduction in the written carrier to noise ratio or an increase in the erased carrier to noise ratio. The exact mechanism for these failures have not heretofore been fully understood.

SUMMARY OF THE INVENTION

According to the method and apparatus of the present invention contrast ratios and the carrier to noise ratios are stabilized and the carrier to noise ratio and contrast ratio failure mode problems associated with increasing cycle number are obviated. According to the invention herein contemplated, there is provided a method of doing one or more of writing data into the state changeable chalcogen memory medium, reading data out of the state changeable chalcogen memory medium, or removing data from the state changeable chalcogen memory medium. The method includes applying projected beam energy to the medium whereby to change a discrete portion of the medium, e.g., an individual cell in the medium from a solid state of first relative order to a solid state of second relative order, through a relatively high mobility intermediate state. Thereafter, projected beam energy is applied to the medium to change the same discrete portion of the medium from the state of second relative order to the state of first relative order, through a relatively high mobility intermediate state.

More specifically, the invention herein contemplated includes switching more ordered material, e.g., crystalline material, to less ordered material, e.g., amorphous material, through a relatively high mobility state, and from a less ordered material, e.g., amorphous material to more ordered material, e.g., crystalline material, through a high mobility state. Both phase changes, e.g. from crystalline to amorphous and from amorphous to crystalline, involve passing through a high mobility state characterized by a relatively low viscosity. The high mobility states may be the same state or different high mobility states. The phase transformations differ in thermal history, that is, in the quench rates and in the melt and quench temperature-time profiles.

According to this preferred exemplification there is provided a method of and apparatus for doing one or more of writing data into a state changeable chalcogenide memory medium, reading data out of a state changeable chalcogenide memory medium, or erasing data from the state changeable chalcogen memory medium. The method contemplated includes vitrifying a cell of the memory medium from a relatively ordered state through a relatively high mobility state to a relatively disordered state. The contemplated invention also includes crystallizing the cell of memory medium from the relatively disordered solid state through a relatively high mobility state back to the relatively ordered solid state. The high mobility states may be the same or different high mobility states.

In a particularly preferred exemplification the method of the invention is carried out using a multicomponent beam to provide the desired melt-quench profiles. Data is written into the chalcogen memory medium, e.g., a discrete portion of the memory medium, with a relatively high energy short duration pulse of projected beam energy. Data is erased from the chalcogen memory medium, e.g., the discrete portion of the memory medium, with an energy beam having two components. One component is a relatively high energy short duration projected energy beam. The other component is a relatively low energy long duration projected energy beam component.

According to the method and apparatus of the invention, the ordering or crystallization process is more complete and the deterioration of the instantaneous and the cycle dependent carrier to noise ratios are reduced.

THE FIGURES

The invention may be understood by reference to the following figures.

DETAILED DESCRIPTION OF THE INVENTION

According to the invention described herein there is provided a method of and apparatus for writing data into, reading data out of, and erasing data from a projected beam data storage device. The data storage device has a data storage medium switchable between detectable states by the application of projected beam energy thereto.

Figure 1:
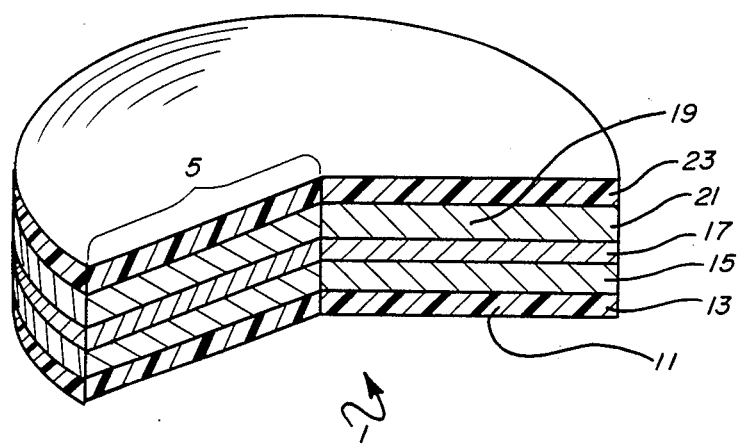
FIG. 1 is an isometric, partial cut away view of a data storage device showing the individual layers of the device in exaggerated vertical scale, and compressed horizontal scale.

FIG. 1 shows a projected beam data storage device, e.g. an optical disc 1. The optical disc 1 has a memory region 5. Within the memory region, 5 shown in partial cut away is a first substrate 11. Deposited atop the first substrate 11 is a first layer of polymer 13. Atop the layer of polymer 13 is a first layer of dielectric 15. Deposited atop the first layer 15 of dielectric is the layer of active chalcogen material 17. The layer 17 of chalcogen material is deposited between the first dielectric layer 15 and a second dielectric layer 19. The second dielectric layer 19 is coated with a polymer layer 21 and a second substrate 23.

The phase changeable material within the active layer 17 is a chalcogen composition containing a chalcogen, most preferably tellurium, a cross linking agent, and optionally other materials as oxygen, sulfur, selenium and tin.

The chalcogen is typically tellurium although other chalcogens, for example, selenium may be present therewith.

The cross linking agents are elements of groups III B, IV B, and V B of the Periodic Chart. Exemplary cross linking agents from groups 111 B, IV B, and V B inlcude aluminum, indium, and gallium, of group III B, silicon, germanium, and tin of group IV B, nitrogen, phosphorous, arsenic, antimony and bismith of group V B and mixtures thereof. Most commonly the cross linking agents are germanium, and tin, with one or more of oxygen or nickel being present.

In one exemplification, the data storage medium 17 is substantially free of oxygen, the chalcogen is tellurium, and the cross linking agent is germanium either alone or with additional cross linking agents such as silicon, tin, arsenic, and or antimony. The chalcogen composition may include oxygen. When oxygen is absent, a switching modulator such as nickel may be present. The switching modulator is described in the commonly assigned, copending U.S. application of Rosa Young and Stanford R. Ovshinsky for IMPROVED PROJECTED BEAM DATA STORAGE MEDIUM, incorporated herein by reference. The atomic ratio of cross linking agents to total composition is from 1 to about 20 atomic percent. The atomic ratio of switching modulator when present, is from about 1% to about 20% and preferrably from 1% to about 10%. The amout of tellurium present is from about 70 to about 90 atomic percent. Additionally, the data storage medium may contain further additives, such as tin, with a ratio of additive to total composition from about 1 atomic percent to about 10 atomic percent.

Barrier layers 15 and 19 are dielectric materials. They may be aluminum oxide, silicon oxide, or germanium oxide. Alternatively they may be nitrides or oxinitrides. Germanium oxide is a particularly satisfactory barrier layer material.

The layer 13 and adhesive layer 21 are polymerized after contact with the insulating layers 15, 19 and the substrates 11 and 23. These materials are typically actinically initiated polymers, exemplified by acrylates and carbonates.

The polymeric substrate is typically a polyacrylate, as poly methyl methacrylate. Alternatively, other transparent or substantially transparent, opticaly anisotropic, organic polymeric materials may be used.

The resulting device shown in FIG. 1 has a total thickness of from about 2.4 mm to about 3.0 mm. The substrates 11 and 23 have individual thicknesses of from about 1.1 mm to about 1.3 mm each. The layers 13 and 21 have thicknesses from 10 microns to about 200 microns. Each of the barrier layers 15 and 19 have thicknesses of from 1000 angstroms to about 5000 angstroms. The active layer 17 has a thickness of from about 100 angstroms to about 1500 angstroms. The specific thicknesses of individual layers and relationships therebetween are a matter which may be optimized by routine experimentation.

Figure 7:
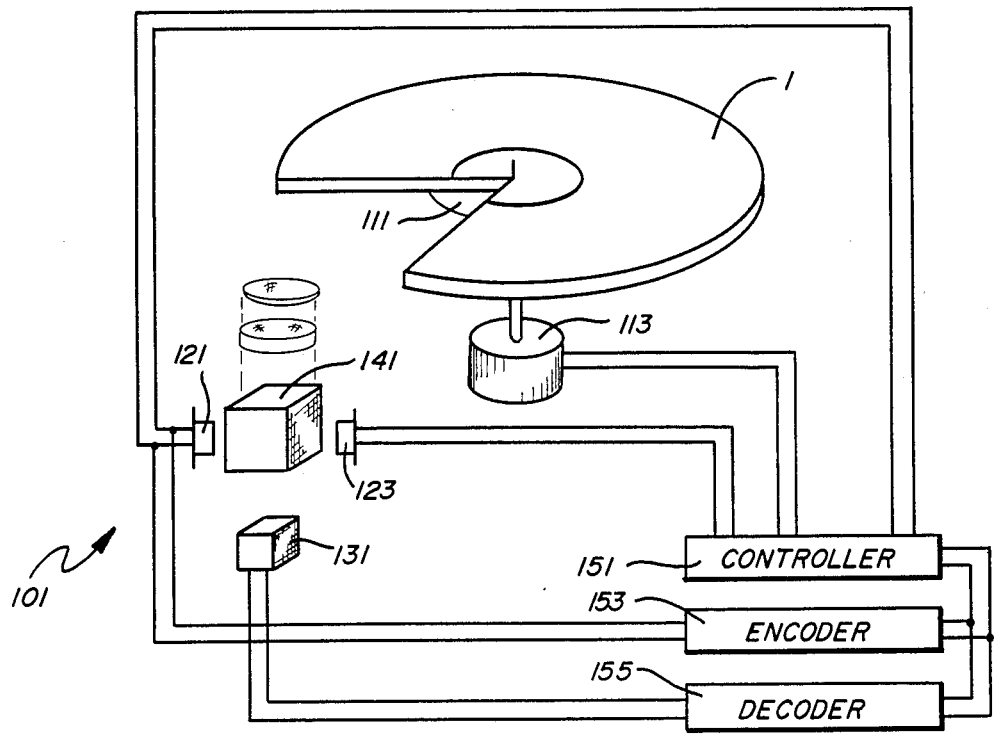
FIG. 7 is a schematic view of an optical data storage system of the invention.

The optical data storage device 101, shown in FIG. 7, is intended for use with an optical data storage device, as optical data storage disc 1. The device, as disc 7, is carried on a means for imparting relative motion thereto, as turntable 111 driven by motor 113. The system further includes projected energy beam means, as lasers 121 and 123, and means for determining the state of the memory material, as photodetector 131, operating through optical system 141.

The lasers, 121 and 123, are controlled by controller means 151 and encoder means 153. The state determining photodetector is controlled by controller means 151 and controls decoder means 155. The controller means 151 includes tracking means for synchronizing the projected beam energy means 121, 13 and relative movement means 111, 113.

The projected energy beam switching of the memory material from the first state of relative order to a second state of relative order is carried out under conditions causing the phase tranformations to proceed through states of high mobility. According to the invention herein contemplated projected beam energy is applied to the medium 17 to change discrete portion of the medium 17 from a solid state having a first relative order, through a relatively high mobility intermediate state, to a solid state of second relative order. The invention further contemplates reversibly applying projected beam energy to the medium 17 to change the discrete portion of the medium 17 from the state of second relative order through a state of relatively high mobility back to the state of first relative order.

Most commonly, this involves vitrifying a discrete portion of the memory medium 17 from a relatively ordered state, for example a crystalline state, through a relatively high mobility state, for example a molten state, to a relatively disordered state, for example, an amorphous state. The discrete portion may then be reversibly switched, for example by crystallization, from the relatively disordered solid state, through a relatively high mobility state, to the relatively ordered solid state, for example, the crystalline state. The high mobility states may be the same state or different states.

The state of first relative order may be a relatively disordered state formed, for example, by a single, relatively high energy, relatively short duration pulse. The melt-quench profile of the relatively high energy short duration pulse is such as to result in a rapid quench rate which quenches in the disorder of the high mobility, e.g., liquid, state. Typically, the single, relatively high energy, relatively short duration pulse has an energy high enough to heat the material above the melting point, but low enough to avoid ablation. The pulse is of short enough duration to avoid significant heating of adjacent areas, thereby allowing relatively rapid cooling from a high mobility, e.g., liquid, state to a relatively disordered solid state. Generally the amount of focussed energy is from about 5 to 20 milliwatts per square micron, and the duration is less than about 200 to 400 nanoseconds.

Generally, the state of second relative order is a relatively ordered state, for example a crystalline state, a polycrystalline state, or a microcrystalline state. The state of relative order is formed by applying an energy beam comprising a relatively high energy short duration component and a relatively low energy long duration component. The relatively high energy, short duration component should be such as to either singly or in combination with the low energy, long duration component heat the memory cell near, to or above the melting point of the memory material. This should be an energy pulse of from about 5 to about 20 milliwatts per square micron and preferrably from about 7 to about 12 milliwatts per square micron. The relatively high energy pulse should have a duration of less than about 400, and preferable less than 200 nanoseconds, for example from about 10 to about 100 nanoseconds. The relatively low energy density long duration pulse has an energy low enough to avoid ablation when used along with the short duration, high energy pulse, but high enough to heat the material to temperatures where crystallization proceeds rapidly. The relatively low energy pulse duration should be such as to foster a slow cooling rate, permitting the crystalline form to nucleate and grow. The low energy density, long duration pulse has a duration of from about 1 to 2 microseconds, and an energy density of from about 1 to 2 milliwatts per square micron. This is about one tenth the energy density of the high energy pulse, applied over a period of about ten times longer than the high energy pulse.

Figure 2:
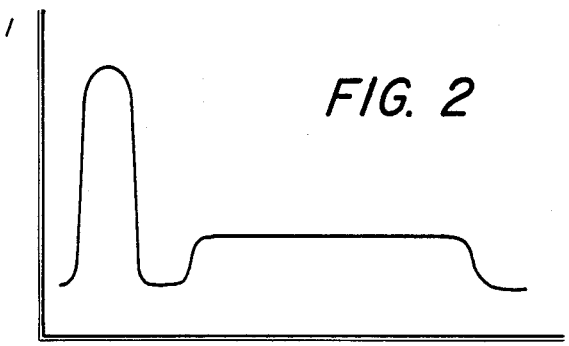
FIGS. 2-6 are representations of five modes of the multicomponent projected beam energy.
Figure 3:
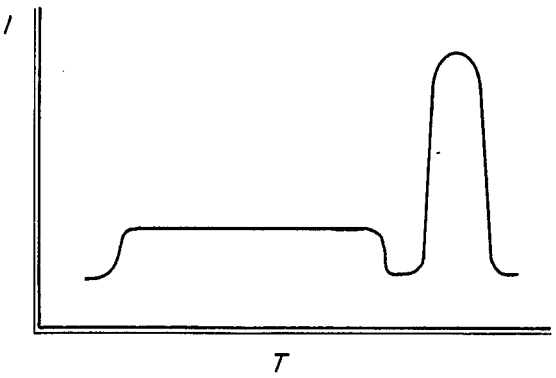

The energy pulses may be sequentially applied, as shown, for example, in FIGS. 2 and 3. In FIG. 2 the high energy pulse precedes the low energy pulse. In FIG. 3 the low energy pulse precedes the high energy pulse. The time between pulses is short enough to allow the cumulative thermal effects herein contemplated to arise. That is, the time between pulses is short enough to avoid undue dissipation of heat between pulses, so as to allow for high mobility, intermediate states and subsequent ordered states to form.

Figure 4:
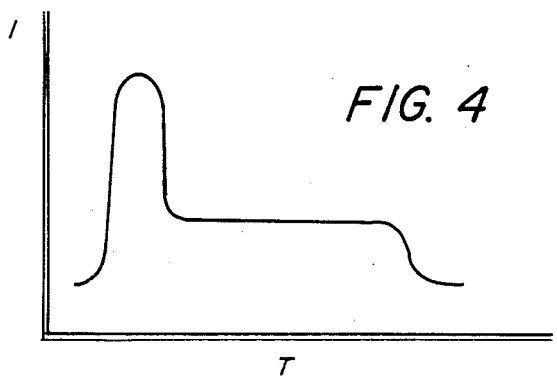
Figure 5:
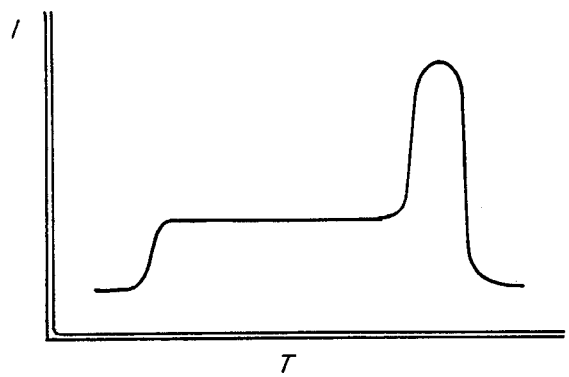
Figure 6:
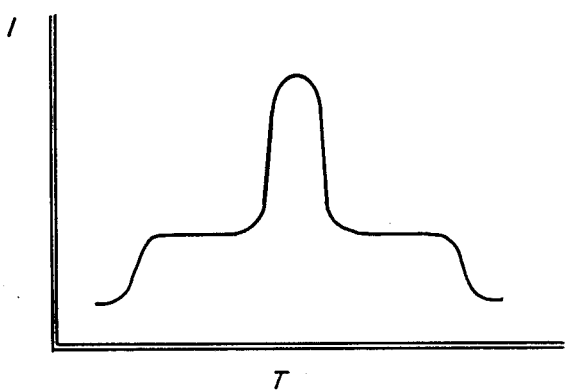

According to a further embodiment of the invention the pulses are substantially superimposed. The pulses may be initiated simulaneously as shown in FIG. 4. The pulses may be extinguished substantially simultaneously as shown in FIG. 5. According to the still further exemplification, shown in FIG. 6, the high energy pulse is initiated after the low energy pulse and is extinguished before the low energy pulse is extinguished.

In this way, data is written into the chalcogenide memory medium 17 with a relatively high energy short duration pulse. The data is erased from the chalcogen memory with complex energy beam having (1) a relatively high energy density, short duration component, and (2) a relatively low energy density, long duration component.

According to the invention herein contemplated the recorded state carrier to noise ratio is greater than 38 decibels and the erased state carrier to noise ratio is less than about 6 decibels.

While the invention has been described with respect to certain preferred exemplifications and embodiments thereof, it is not intended to limit the scope of the invention thereby but solely by the claims appended hereto.

I claim:

1. A method of doing one or more of writing data into, reading data out of, or removing data from a state changeable, chalcogenide memory medium, comprising the steps of:

(a) applying projected beam energy to the medium to change a discrete portion of the medium from a solid state of first order through a high mobility intermediate state, to a solid state of second order; and (b) applying projected beam energy to the medium to change the discrete portion of the medium from the solid state of second order through a high mobility intermediate state, back to the solid state of first order.

2. The method of claim 1 wherein the state of first order is a relatively disordered state formed by a single, relatively high energy density, relatively short duration disordering pulse.

3. The method of claim 2 wherein the high energy disordering density pulse has an energy density of about 5 to 20 milliwatts per square micron.

4. The method of claim 2 wherein the high energy density disordering pulse has a duration of less than about 400 nanoseconds.

5. The method of claim 1 wherein the state of second relative order is a ordered state formed by applying an energy beam comprising:

(a) a relatively high energy density, short duration component, and (b) a relatively low energy density, long duration component.

6. The method of claim 5 wherein the high energy density component has an energy density of about 5 to 20 milliwatts/square micron.

7. The method of claim 5 wherein the high energy density component has a duration of less than about 400 nanoseconds.

8. The method of claim 5 wherein the low energy density component has an energy density of about 1 to 2 milliwatts/square micron.

9. The method of claim 5 wherein the low energy density component has a duration of about 1 to 2 microseconds.

10. The method of claim 5 wherein the components are sequentially applied.

11. The method of claim 10 wherein the high energy density component precedes the low energy density component.

12. The method of claim 10 wherein the low energy density component precedes the high energy density component.

13. The method of claim 5 wherein the components are substantially superimposed.

14. The method of claim 13 wherein the components are initiated substantially simultaneously.

15. The method of claim 13 wherein the components are extinguished substantially simultaneously.

16. The method of claim 13 comprising initiating the high energy density component after initiating the low energy density component, and extinguishing the high energy density component before extinguishing the low energy density component.

17. The method of claim 1 wherein the recorded carrier to noise ratio is at least about 38 decibels.

18. The method of claim 1 wherein the erased carrier to noise ratio is less than about 6 decibels.

19. The method claim 1 comprising writing data by vitrifying said memory material, and erasing data by crystallizing said memory material.

* * * * *